April 17, 1945.  R. P. HANNA ET AL  2,374,013
TROLLEY CONDUCTOR DEVICE
Filed Jan. 7, 1944
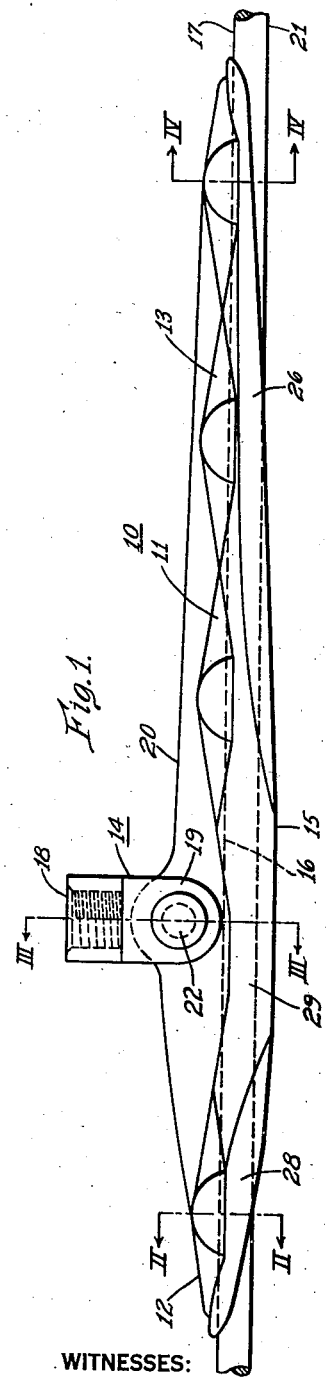
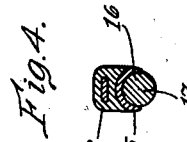
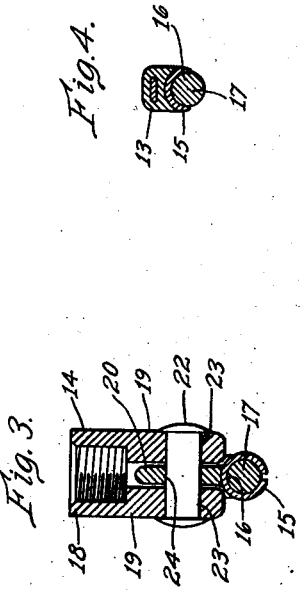
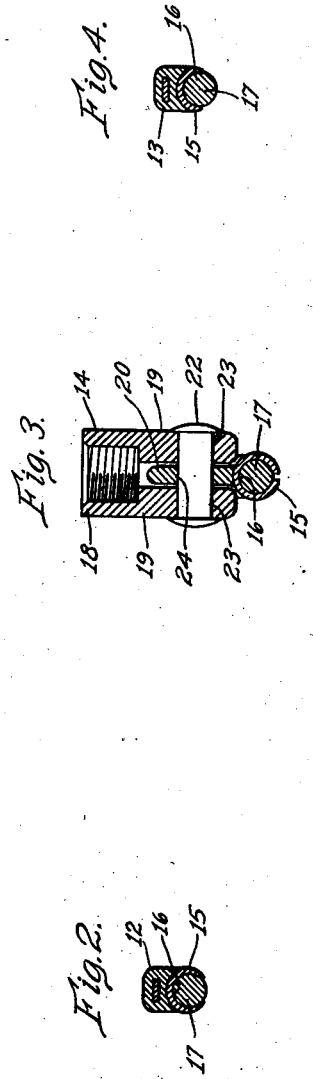
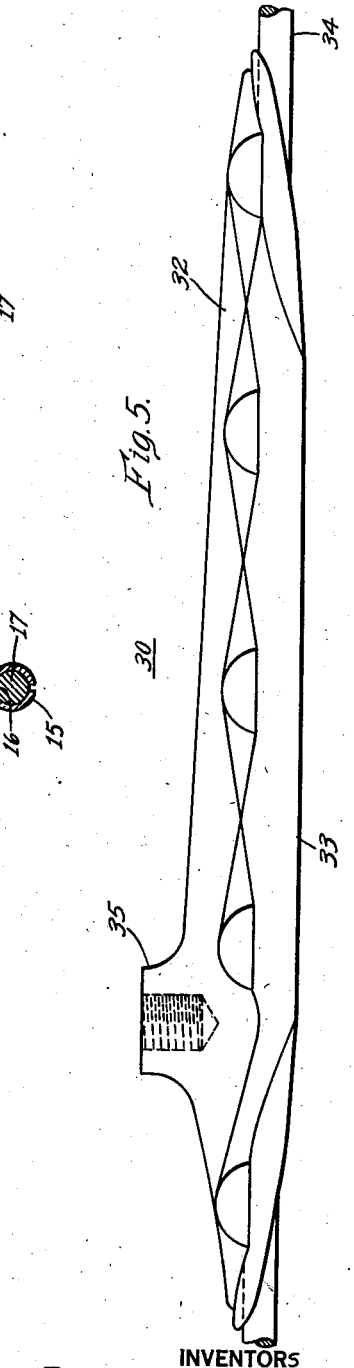
WITNESSES:
C. J. Weller.
F. V. Giolma
INVENTORS
Raymond P. Hanna
and Leland F. Brahmer.
BY
G. M. Crawford
ATTORNEY Patented Apr. 17, 1945

2,374,013

UNITED STATES PATENT OFFICE 2,374,013

TROLLEY CONDUCTOR DEVICE

Raymond P. Hanna and Leland F. Brahmer, Pittsburgh, Pa., assignors to Westinghouse Electric & Manufacturing Company, East Pittsburgh, Pa., a corporation of Pennsylvania Application January 7, 1944, Serial No. 517,300

10 Claims. (Cl. 191—43)

Our invention relates generally to trolley conductor devices and has reference, in particular, to trolley ears.

Generally stated, an object of our invention is to provide an improved construction for trolley ears which will be simple and inexpensive to manufacture and smooth and durable in operation.

More specifically, it is an object of our invention to provide for preventing gouging of a trolley conductor adjacent the trailing or leaving end of a trolley ear by providing the ear with a relatively long tapered trailing or leaving end portion.

It is also an important object of our invention to provide for supporting a trolley ear adjacent the leading or entering end so as to provide for rocking of the trailing or leaving end as a current collector shoe leaves the ear.

Another object of our invention is to provide for cushioning the impact of a current collector shoe with the trolley wire as it leaves a trolley ear by supporting the trolley ear at a point relatively distant from the trailing end.

Yet, another object of our invention is to provide a trolley ear having a relatively long trailing or leaving end portion with gradual taper on the lip portion on the trailing or leaving end portion so as to protect a trolley conductor against gouging by a current collector shoe and cover up gouged spots caused by using ears of the usual type.

Still another object of our invention is to provide for pivotally mounting a support boss on a trolley ear so as to support the trolley ear adjacent the leading end, whereby the trailing end may pivot more or less freely about the point of support and cushion the impact with the conductor of a current collector shoe leaving the ear.

Other objects are in part obvious, and will in part be described hereinafter.

In accordance with our invention, the support boss on a trolley ear is positioned relatively close to the leading or entering end of the ear so that the trailing end is relatively long and may pivot more of less readily about the point of support to cushion the impact of a current collector shoe with the trolley conductor as it leaves the ear. The depending lips which grip the trolley conductor are provided with a relatively long taper both as to depth and thickness at the trailing end to insure a smooth transfer of the current collector shoe from the ear to the trolley conductor.

For a more complete understanding of the nature and scope of our invention, reference may be made to the following detailed description which may be studied in connection with the accompanying drawing, in which:

Figure 1 is a side elevational view of a trolley ear embodying the invention in one of its forms.

Fig. 2 is a sectional view taken along the line II—II of the Fig. 1 with the lips pressed about the trolley conductor.

Fig. 3 is a sectional view taken along the line III—III with the lips pressed about the trolley conductor.

Fig. 4 is a sectional view taken along the line IV—IV at a point substantially equal distant from the opposite end of the ear as the section shown in Fig. 2 with the lips also pressed about the trolley conductor, and Fig. 5 is a side elevational view of a trolley ear embodying the invention in another of its forms.

Referring to Figs. 1 through 4, the reference numeral 10 denotes, generally, a trolley ear having an elongated body portion 11 with leading and trailing end portions 12 and 13 extending on opposite sides of a support means 14 and provided with depending lips 15 on the lower side defining a groove 16 for receiving the trolley wire 17. The lips 15 may either be formed as an integral part of the body member 12 or may be formed separately and secured thereto in any suitable manner such as by casting the body member 12 in interlocking relation with portions of the lips in a manner well known in the art. For example, the lips may comprise a channel of a relatively high conductivity and more or less ductile metal such as copper, while the body portion may be molded or die-cast of a relatively high strength metal such as an aluminum bronze alloy.

In order to provide for cushioning the impact of a current collector traversing the trolley ear 10 in a direction from left to right the support means at 14, instead of being positioned adjacent the center of the body portion 11, may be positioned relatively close to the leading or entering end of the ear so as to provide a relatively long trailing or leaving portion 13 to the right thereof. This arrangement permits the trolley ear to rock or pivot about the point of support as a current collector shoe moves along the trailing or leaving end, thus cushioning any impact of the shoe with the trolley conductor 17 when it finally leaves the ear. This rocking motion prevents gouging of the ear as at the area 21, where it would be likely to occur were the end portion 13 the trailing end portion of a trolley ear of the usual type which is supported at or near the center. However, since the trailing end portion 13 is longer than the trailing end portion of ears of the usual type, the end portion 13 would actually cover any worn or gouged spot caused by using an ear of the usual type, in addition to preventing the formation of further such spots.

With a view to facilitating rocking or pivoting of the body portion 11 of the ear as the current collector shoe moves thereon, the support means 14 may be pivotally mounted on the body member. For example, as shown in Figs. 1 and 3, the support means 14 may comprise a threaded boss 18 having spaced apart depending ears 19 adapted to be positioned on either side of a longitudinal rib 20 extending along the upper side of the body portion 11 of the ear. The support means may be secured to the body portion 11 in any suitable manner such as by a pin 22 extending through openings 23 in the depending ears 19 and opening 24 in the longitudinal rib 20.

In order to minimize the impact with the trolley conductor 17 of a current collector shoe leaving the ear 10 the depending lips 15 may be provided with a relatively long and gradual tapered portion 26 on the trailing or leaving end 13 wherein both the thickness and depth of the lips decreases from a maximum to a minimum at the end. The leading or entering end 12 of the ear 10 may be provided with a relatively short tapered portion 28 of the usual design to provide a relatively smooth entry for a current collector shoe onto the trolley ear.

In accordance with my invention, the tapered portion 28 may be relatively short, occupying a portion having a length, for example, of from one-quarter to one-third of the overall length of the trolley ear. The tapered portion 26, however, may have a length of from about three-fifths to three-quarters of the overall length of the trolley ear. Intermediate these tapered portions 26 and 28 there is a portion 29 wherein the lips may have their maximum thickness and depth. The length of this portion which lies immediately beneath the support means 14 may vary from a mere junction of the two tapered portions to about one quarter of the overall length of the ear. The maximum holding power of the ear therefore is provided for the trolley conductor 17 at the point of support.

Accordingly, it will be seen that not only is the trolley ear of our invention supported at a point much closer to the leading end than to the trailing end, but the transfer of a current collector shoe between the trolley conductor and the ear is much more gradual at the trailing or leaving end than at the leading or entering end. Thus gouging of the trolley conductor 17 at the trailing end such as occurs with shoes on the usual type of ear is cumulatively prevented, since the trolley ear is permitted to rock about the point of support, thus cushioning any impact between the current collector shoe and a trolley conductor and, at the same time, the rate of transfer of the current collector shoe from a trolley ear to the conductor is reduced to a minimum since the lips 15 are cut away much more gradually on the trailing end than at the leading end. In addition, where a trolley ear embodying the features of our invention is installed in place of a trolley ear of the usual type which has both a relatively blunt or abrupt leading and trailing ends, it will cover the usual point of gouging in the trolley wire, thus reinforcing the wire, as well as preventing any further gouging.

Referring to Fig. 5, the reference numeral 30 may denote generally a trolley ear having a body portion 32 with depending lips 33 adapted to be formed about the trolley conductor 34 for supporting it. In order to provide for cushioning the impact of a current collector shoe with the conductor 34 on leaving the trolley ear 30 the support boss 35 of the trolley ear may be so positioned intermediate the ends of the ear that the ear may be rocked about its point of support. For example, the support boss 35 may be positioned at a distance of about one-quarter to one-third of the length of the ear from the leading or entering end so that the trailing or leaving end of the ear extends for about from two-thirds to three-quarters of the overall length of the ear. The taper of the lips 33 at the leading and trailing ends may be substantially similar as shown, or different tapers may be provided, such as shown in Fig. 1 of the drawing.

This relatively long trailing end portion permits the trailing end to pivot upwardly about the point of support as a current collector shoe passes therealong, thus cushioning greatly the impact of the current collector shoe with the trolley conductor 34 when it leaves the trolley ear. This cushioning effect caused by the rocking motion of the ear effectively prevents gouging of the trolley conductor 34 by the current collector shoe.

From the above description and accompanying drawing, it will be apparent that we have provided in a simple and effective manner for reducing the wear of trolley conductors due to gouging of the conductors by current collector shoes as they leave the trolley ears. Our invention may be easily embodied in present commercial constructions with a minimum of expense and labor. Because of the off-centered positioning of the support means in a trolley ear embodying our invention, the workmen may readily determine at a glance the direction for installation of a trolley ear, and no particular marking thereof is really necessary although it may be readily included if desired. In addition, replacement of ears of the usual type affords protection for spots already gouged as well as preventing any further gouging.

Since certain changes may be made in the above described construction and different embodiments of the invention may be made without departing from the spirit and scope thereof it is intended that all the matter contained in the above description, and shown in the accompanying drawing, shall be considered as illustrated and not in a limiting sense.

We claim as our invention:

1. A trolley ear comprising, an elongated metal body having dependent lips with tapered end sections separated by a non-tapered section for receiving a conductor, and support means for the ear positioned on the non-tapered section adjacent the leading end to provide a relatively long trailing end.

2. A trolley conductor support comprising, an elongated body member having dependent lips along the lower edge for securing a conductor, said lips being of increasing depth and thickness for a portion extending from three-fifths to three-quarters of the length from the trailing end and a portion extending from two-fifths to one-quarter of the length from the other end, and support means for the support positioned on the upper edge intermediate the said portions.

3. An elongated conductor support having dependent lips along the lower side for securing a conductor, said lips tapering in thickness and depth from a point intermediate the ends towards the ends and having a much longer and more gradual taper on the trailing end than on the leading end, and a support boss positioned on the upper side relatively close to the leading end in the region of maximum lip thickness and depth.

4. A conductor support comprising, a copper channel having dependent lips provided with a relatively short taper on the leading end and a relatively long and gradual taper on the trailing end separated by a section of uniform thickness and depth, and support means on the upper side positioned intermediate the ends of the section of uniform thickness and depth nearer the leading end of the channel.

5. A conductor support comprising, an elongated metal member having depending spaced lips forming a groove for receiving the conductor, and support means positioned nearer one end than the other, said lips being of gradually increasing depth and thickness from the ends towards the support means and having the maximum depth and thickness at the support means.

6. A trolley ear comprising, an elongated conductor securing means having spaced apart dependent lips defining a groove for the conductor said lips being tapered adjacent the ends in thickness and depth, and support means pivotally secured to the conductor securing means nearer the leading end than the trailing end.

7. A trolley ear comprising, a support member, and an elongated body member secured thereto and having dependent spaced lips of decreasing depth and thickness from the support member towards the ends, said body member projecting further on one side than on the other.

8. In a trolley ear, in combination, a support member, and an elongated channel comprising adjoining portions integral with the support member, one of said portions projecting therefrom further in one direction than the other portion extends in the opposite direction and having dependent spaced lips for clamping a trolley conductor, said lips being of uniformly increasing depth throughout substantially the length of each of the different portions.

9. A trolley ear comprising, support means, and elongated conductor securing means projecting from the support means in opposite directions having spaced apart dependent lips bendable into engagement with a conductor, said means projecting in one direction a distance which is of the order of three times the distance in the other direction, and said lips being of increasing depth and thickness from the ends of the projecting portions so as to provide a maximum depth and thickness beneath the support means.

10. A trolley ear comprising, an elongated body member having a support boss pivotally mounted thereon adjacent one end, and dependent lips on the body member tapered as to depth and thickness from points substantially equidistant from the support boss to the ends.

RAYMOND P. HANNA.
LELAND F. BRAHMER.